United States Patent Office 2,841,945
Patented July 8, 1958

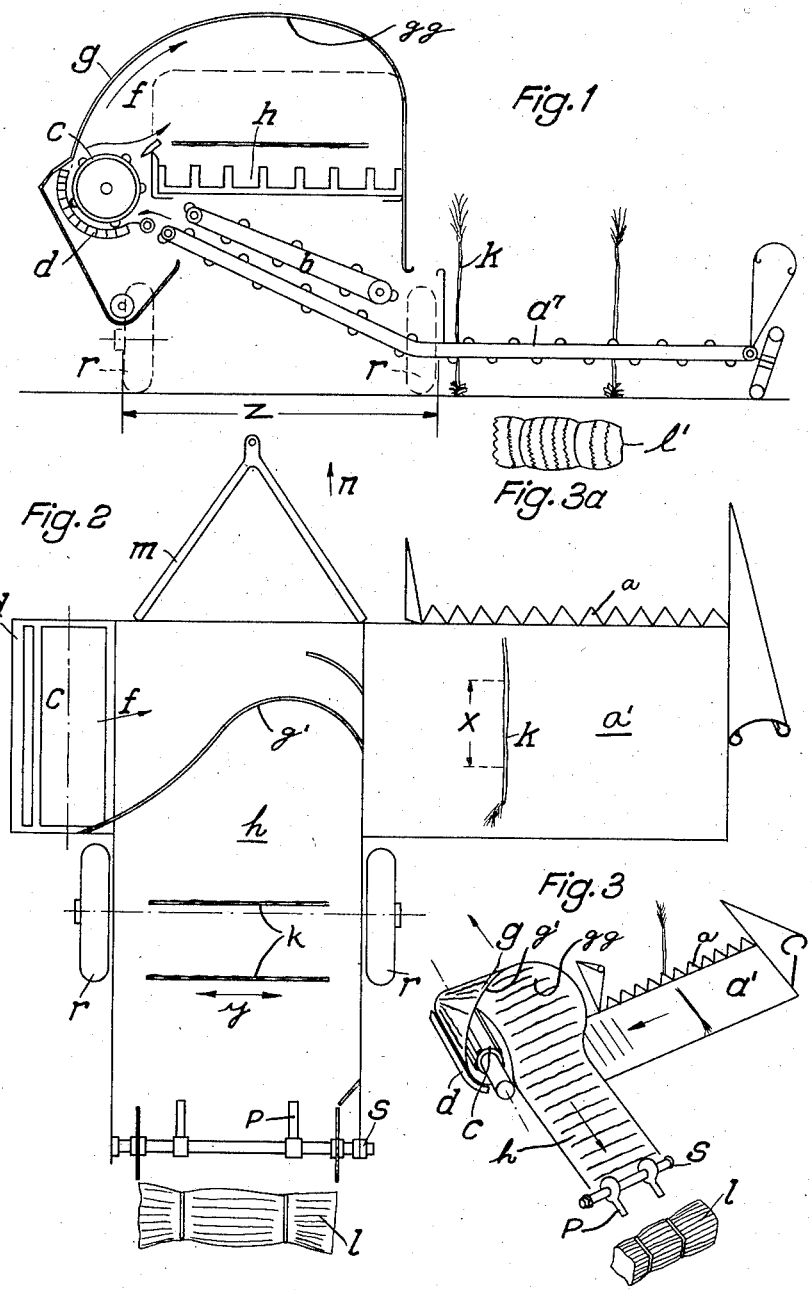

2,841,945

HARVESTER COMBINE

Walter Gustav Brenner, Harsewinkel, Westphalia, Germany

Application May 19, 1955, Serial No. 509,593
In France July 5, 1946

Public Law 619, August 23, 1954
Patent expires July 5, 1966

2 Claims. (Cl. 56—122)

The present invention relates to harvesting and threshing machines, and more particularly to a combine in which the reaping mechanism is disposed at an angle to the threshing mechanism and in cantilever fashion along the side thereof, while the later extends in the direction of travel of the machine.

Although such angular combine is the oldest form of combine construction, there has, in recent years, been a departure therefrom, especially insofar as combines of small size are concerned, since this construction is attended by a number of structural disavantages resulting from the fact that combines of this type wherein the reaper is disposed at an angle to the thresher assume considerable space owing to the fact that prior to this invention the two machines were separated by a flat inclined conveyer leading from the reaper to the thresher housing which in the case of larger machines increased their width by approximately 6 feet. This constituted a disadvantage particularly in small combines, since the width required for preliminary reaping thereby became excessive, leading to the abandonment of the manufacture of machines with such angular arrangement of the reaper. Small preliminary reaping widths, that is, small areas which necessarily have to be reaped about each field by hand, or with a special machine before operations with the combine can be commenced, are of substantial importance especially on smaller farms using small combines, and should not considerably exceed the width of the horses or the tractor pulling the machine.

Furthermore, the angular arrangement of this type of combine was attended by certain difficulties in the conveyance of the straw, particularly at the point of intersection between the reaper and thresher. At this point the material being conveyed had to undergo a sudden change in direction which required the bundle of stalks to be drawn apart in the longitudinal direction, which is a matter of difficulty if the stalks are long.

On the other hand, the angular arrangement of the two parts of the machine possesses considerable advantages over other machines of a different type, above all, by the fact that the cutting mechanism can be extended to any desired width and be adapted to the product being harvested, while the shaker surfaces, since they extend in the direction of travel of the machine, may be made as long as desired.

It is the principal object of the present invention to eliminate the disadvantages of such angular combines as pointed out above, while maintaining all their basic advantages.

Another object of the present invention is to reduce the width of the combine by providing the flat inclined conveyer within the thresher housing.

A further object of the present invention is to provide new means for conveying the stalks from the reaper to the thresher in a new manner so as to provide a more gradual change of the direction of movement of the stalks and to avoid that the bundles of stalks will be pulled apart in the longitudinal direction.

Another object of the present invention is to turn the stalks from the longitudinal direction, that is, from the direction of travel of the machine, to a direction transverse thereto so as to feed the stalks transversally to the shaker which considerably improves the operation and output thereof.

Also, it is a fact well known in the art that straw binders and straw presses, due to their particular construction, handle the straw much better and with considerably less chances of a breakdown or other interruptions if the straw is fed thereto in a transverse direction. Straw binders will never even handle the stalks properly if the latter are disposed longitudinally, and they require them to lie transversally when being fed thereto, while straw presses, and especially those of the lighter variety, operate much more efficiently on stalks which are disposed transversally.

Therefore, it is another object of the present invention to turn the stalks in an angular combine so that when feeding them to a straw binder or straw press, if connected to such combine, they will be disposed in a direction transverse to the direction of travel of the machine. Aside from many other material advantages, such transverse feeding of the stalks of straw permits the use of smaller, light-weight straw presses.

Further objects, features, and advantages of the present invention will be apparent from the following detailed description of one preferred embodiment thereof, as well as from the accompanying drawings, in which:

Fig. 1 shows a diagrammatic general view of the combine according to the invention as seen from behind and in the driving direction thereof;

Fig. 2 shows a top view thereof;

Fig. 3 shows diagrammatically and on a reduced scale a perspective view of a layer of straw as it is passed through the machine; while Fig. 3a shows a view of a bale of straw with the stalks disposed longitudinally to the direction of travel, that is, in a direction transverse to the length of the bale.

Referring to the drawings, and first particularly to Figs. 1 and 2, the combine herein disclosed comprises a reaper $a$ extending horizontally and transversely to the travelling direction $n$; an inclined converyer $b$ for conveying stalks from the reaper to a thresher comprised of a threshing drum $c$ which, together with a cage $d$, forms a beater; and a drum outlet $f$ leading to a hood $g$ which extends upwardly over and then laterally of said drum and has, as shown in Figures 1 and 3, an inner conical surface $gg$ against which the threshed stalks are thrown by the drum $c$. The conical surface constitutes guiding means for turning the straw stalks and depositing them on a shaker $h$ which constitutes a part of the combine and extends in the direction $n$ as does the axle of the threshing drum $c$.

The stalks are positively conducted through the machine in such a manner that after they have first been cut by the reaper in the usual manner, they are conveyed by the conveyer belt $a'$ of reaper $a$ and the inclined conveyer $b$ to the underside of drum $c$ of the thresher which threshes the stalks and upwardly ejects the straw with the loose grain still contained therein through the drum outlet $f$. The stalks are thus shoved against said conical surface, which have a curved, forwardly swept rear edge $g'$, to automatically turn the stalks from a position substantially in a direction longitudinally to the direction of travel of the machine which they had assumed up to that time, to a position transverse thereto, so that, subsequently, they will be deposited by the shaker $h$ in such transverse direction and thus passed to the straw baler $b$ having bearings $s$.

Fig. 2 illustrates the stalks $k$ as being disposed longitudinally to the direction of travel of the machine, as also indicated by the arrow $x$, while those on the shaker $h$ are disposed transversally thereto as indicated by the letter $y$. The bale of straw $l$ clearly shows the position of the stalks when baled. The drawings further show the wheels $r$ supporting the machine (Figure 1) and the tractor bar $m$ of the machine, while the direction of travel of the machine, as mentioned, is indicated by the arrrow $n$.

The perspective view shown in Fig. 3 clearly illustrates the manner in which the layer of stalks passes through the machine, as well as the angular position of the reaper $a$ relative to the thresher and shaker $h$. Owing to the gradual turning of the stalks by means of the conical inside surface of the hood $g$ and the drum $c$ cooperating therewith, any possibility of the machine getting choked is avoided. Fig. 3 also illustrates the particular manner in which the straw is turned from the longitudinal direction $x$ (Fig. 2) to the transverse direction $y$, in which direction it is then deposited in the bale $l$.

The advantages of the arrangement as described may be described as follows:

As shown by the drawings, the reaper $a$ is disposed immediately adjacent to the thresher, a result which is accomplished by the disposal of the inclined conveyer $b$ within the thresher housing $g$. In this manner a very compact construction is obtained. The very gradual rise of the inclined conveyer permits the use of an endless belt so that the loss of grain is reduced to a minimum. Since the threshing drum $c$ ejects the material in the upward direction, the threshing cage $d$ may be made quite long. The manner of feeding the straw to the longitudinally directed shaker $h$ with the stalks $k$ being turned transversely thereto results in a particularly effective shaking effect. Owning to the fact that the drum $c$ ejects the straw against the conical and recessed hood $g$, the stalks are turned positively, as well as automatically from the longitudinal direction to the transverse direction without the use of any special conveying means. Since the stalks are hardly shifted relative to each other during such turning movement as well as at the point of connection between the reaper and the thresher, but remain substantially parallel to each other during their entire movement through the machine, the turning motion is more gentle and gradual and there is considerably less danger that the machine will ever get choked than in similar combines of prior construction. The transverse position of the stalks in the machine results in the further advantage that a straw baler $p$ can be attached thereto, a fact which could previously be accomplished only with transversely disposed combines but not with the angular type.

Fig. 3a illustrates some additional advantages obtained by means of the invention. It shows a pressed bale of straw, in which it is assumed that the individual stalks have passed through the machine while disposed in a longitudinal direction. A comparison of the bale $l'$ shown in Fig. 3a with the bale $l$ shown in Figs. 2 and 3, in which the stalks are longitudinally disposed in the bale, clearly shows that the production of the latter type of bales is a much more simple matter and that the straw presses required therefor may be of a much lighter variety than those needed to produce a bale of the type shown in Fig. 3a wherein the straw is disposed transversally to the length of the bale.

Still another advantage of the invention is disclosed in Fig. 1, in which the distance $z$ indicates the preliminary reaping width of the machine, that is, the width of the area which must be reaped by hand or with a special machine before operation of the combine may be commenced. It will be evident that by disposing the inclined conveyer in the thresher housing itself and by also turning the direction of the stalks within the housing, as well as by the compact arrangement of the entire mechanism according to the invention, the preliminary reaping width will be considerably reduced and that despite the use of long shaking surfaces, the machine will reduce the preliminary reaping width to no more than than about 6 feet, that is, a width which is not much larger than that required by a binder.

Although my invention has been illustrated and described with reference to the prefered embodiments thereof I wish to have it understood that it is in no way limited to the details of such embodiments or to the specific examples described, but is capable of numerous modifications within the scope of the appended claims.

Having thus fully disclosed my invention, what I claim is:

1. For use in a combine, the combination of rotary threshing means including a thresher drum having a generally upwardly disposed material-discharge outlet, a hood associated with said drum adjacent its outlet, said hood extending upwardly over and then laterally of the drum and being substantially in the form of a truncated cone whereby the material discharged from said drum will be turned substantially laterally with respect to the drum without disturbing its relative interrelationship.

2. The combination substantially as set forth in claim 1 for use on a travelling combine, wherein the thresher drum is arranged with its axis extending in the direction of travel of the combine, and said hood is adapted to turn the material discharged from the drum laterally with respect to said direction of travel.

References Cited in the file of this patent

UNITED STATES PATENTS

| 1,897,611 | Grasswick | Feb. 14, 1933 |

FOREIGN PATENTS

| 844,459 | France | Apr. 24, 1939 |
| 853,780 | France | Dec. 16, 1939 |
| 452,478 | Italy | Oct. 22, 1949 |